(12) United States Patent
Grabon et al.

(10) Patent No.: US 6,711,911 B1
(45) Date of Patent: Mar. 30, 2004

(54) EXPANSION VALVE CONTROL

(75) Inventors: Michel K. Grabon, Bressolles (FR); Philippe Rigal, Savigneux (FR); Ba-Tung Pham, Chassieu (FR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/301,042

(22) Filed: Nov. 21, 2002

(51) Int. Cl.[7] .............................................. F25B 41/04
(52) U.S. Cl. ........................................ 62/225; 62/175
(58) Field of Search ........................ 62/225, 208, 209, 62/210, 175

(56) References Cited

U.S. PATENT DOCUMENTS

| | | | |
|---|---|---|---|
| 4,706,469 A | * 11/1987 | Oguni et al. | 62/222 |
| 5,632,154 A | * 5/1997 | Sibik et al. | 62/99 |
| 6,148,628 A | * 11/2000 | Reason et al. | 62/223 |
| 6,318,101 B1 | * 11/2001 | Pham et al. | 62/225 |

* cited by examiner

Primary Examiner—Marc Norman

(57) ABSTRACT

An expansion valve is controlled in response to sensing conditions at the outlet of at least one compressor within a refrigeration loop in a manner that achieves low suction superheat operation of the compressor. In particular, a discharge superheat is computed using data obtained from a specific mathematical model of the compression process corresponding to the current capacity stage of the compressor. The position of the expansion valve is controlled so as to result in an actual discharge superheat being within a predetermined dead band amount of the computed discharge superheat.

24 Claims, 5 Drawing Sheets

EXPANSION VALVE CONTROL

BACKGROUND OF THE INVENTION

This invention relates to expansion devices used in refrigeration and air conditioning systems to adjust the flow of refrigerant in a refrigeration circuit. In particular, this invention relates to expansion devices used in refrigeration and air conditioning systems that require several stages of cooling capacity.

A role of an expansion device in refrigeration and air conditioning systems requiring several stages of cooling capacity is to configure its geometry (orifice size) in such a way that the refrigerant mass flow through the device corresponds exactly to the mass flow generated by the one or more compressors. This control of refrigerant flow must also maintain an optimum gas condition of the refrigerant entering the suction side of the compressor.

Thermal expansion valves, TXVs, and electronically controlled expansion valves, EXVs, are used in refrigeration and air conditioning systems. The traditional approach for controlling TXVs or EXVs is to provide a signal that opens or closes the valve based on an evaluation of suction gas superheat. Superheat is the difference between actual refrigerant temperature and saturated refrigerant temperature (temperature corresponding to the phase change). In thermal expansion valves (TXV) the type of control used is analog. The TXV is equipped with a bubble in a compressor suction line which senses the refrigerant temperature. A pressure signal corresponding to the suction line pressure is provided as well. Based on these two signals (refrigerant temperature and refrigerant pressure at the compressor inlet), the analog system adjusts the TXV opening to maintain a requested level of suction superheat (set point). This kind of expansion device has a limited range of application. If the refrigeration circuit can operate with a large span of capacities and with a large span of operating conditions, then the TXV type of controls cannot be optimized in all possible operating envelopes.

Electronic expansion devices (EXV) are usually electronically driven valves that are adjusted based on more or less sophisticated control algorithms. The adjusted EXV opening should be such that the refrigerant entering the evaporator fully evaporates in the evaporator. In this regard, there should preferably be no liquid refrigerant droplets leaving the evaporator. This is extremely important because excessive amounts of liquid refrigerant entering the compressor from the evaporator may result in compressor failure. To be sure that no liquid refrigerant leaves the evaporator, significant suction superheat is usually required. This requirement to optimize evaporator effectiveness counters the objective of achieving the best system efficiency by minimizing the suction superheat requirement.

To satisfy a safe operation of the compressor and also achieve good overall system efficiency, the suction superheat is usually maintained at a level of approximately 5° C. Significant improvement of system efficiency would be obtained if one could however guarantee that no liquid refrigerant droplets enter the compressor with a lower suction superheat. It is however extremely difficult to measure the temperature difference defining suction superheat at a magnitude lower than 5° C. with reasonable confidence. In particular when the refrigerant is close to saturation, problems of refrigerant misdistribution or refrigerant homogeneity makes it almost impossible to measure this temperature difference.

SUMMARY OF THE INVENTION

The invention provides for the control of an expansion valve without relying on measuring temperature at the suction side of a compressor. In particular, the control of the expansion valve is premised on a computation of discharge superheat using a mathematical algorithm based upon the current capacity of one or more activated compressors. The computation of the discharge superheat is preferably based on sensed suction and discharge pressures for the one or more compressors. The computed discharge superheat is compared with an actual discharge superheat that is based on a sensed discharge gas temperature. The comparison preferably permits the actual discharge superheat to be within a prescribed amount of the computed discharge superheat. This computational process has a much lower likelihood of error when contrasted with a computation based on sensing suction temperature. In this regard, when the compressor or compressors operate in the so called "flooded condition" (no suction superheat), the measurement of conditions of the refrigerant in an evaporator leaving section or compressor entering section gives no idea about the refrigerant quality (quantity of liquid refrigerant in a mixture) entering the compressor. In reality, when the refrigerant entering the compressor is a saturated gas or mixture of the saturated gas and liquid, the refrigerant temperature is equal to refrigerant saturated temperature with suction superheat being equal to 0. It is impossible to make a distinction between acceptable, transient operation with some liquid droplets entering the compressor and an operation with large amount of liquid, which results in a very rapid compressor failure.

Computing superheat based on the conditions of the refrigerant at discharge from the compressor allows a control to clearly distinguish refrigerant quality (amount of liquid in a mixture) entering the compressor. Knowing the refrigerant quality while operating with minimal or no suction gas superheat allows for an appropriate control of the EXV opening in a transient, low suction superheat.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
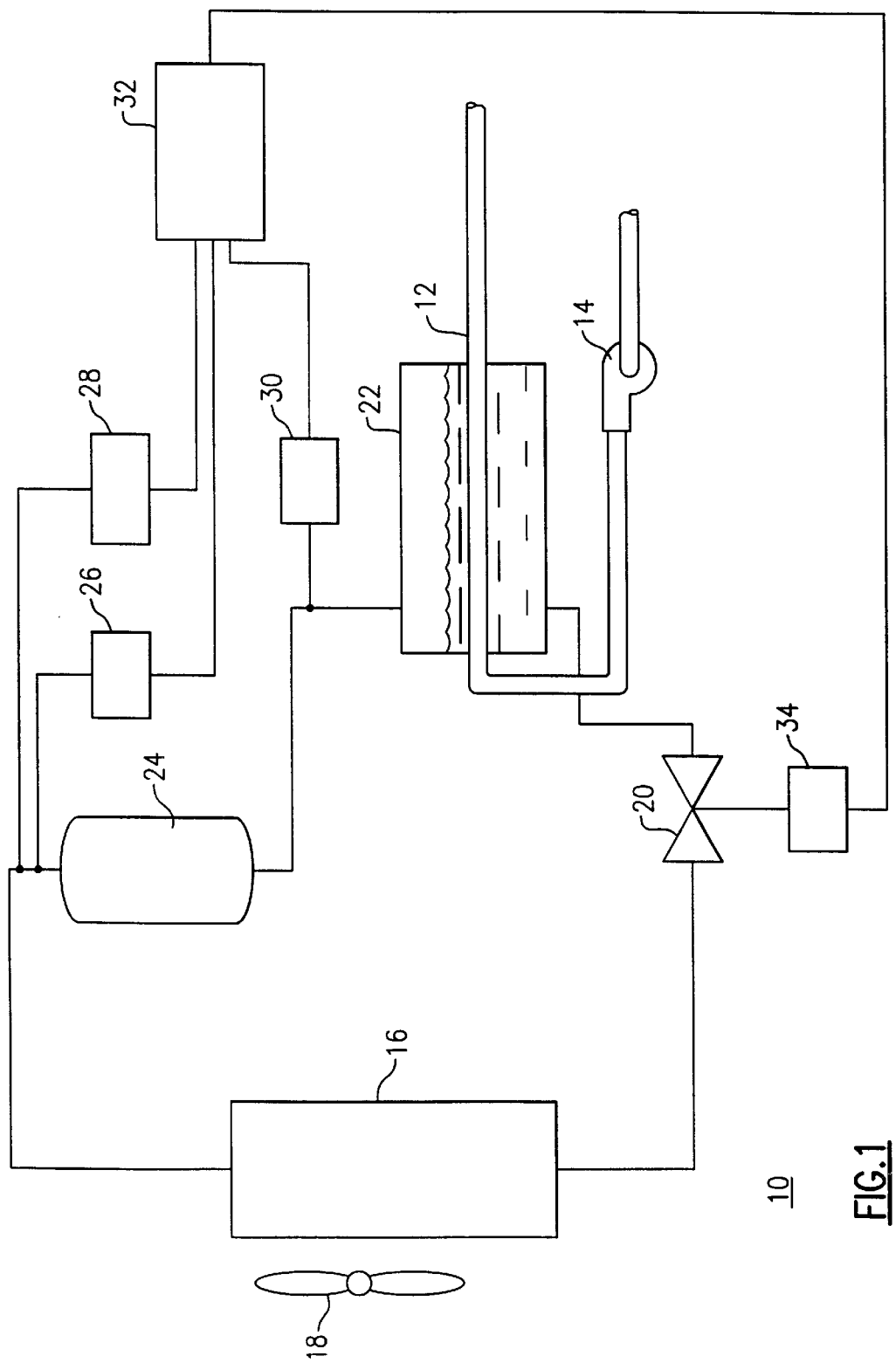
FIG. 1 is a schematic view of a chiller system for delivering chilled water to a downstream load.

Referring to FIG. 1, a chiller system 10 delivers chilled water via a pipeline 12 to various distribution points that are not shown. It is to be appreciated that the distribution points may be one or more fan coil heat exchangers that condition air flowing through the fan coil heat exchangers having a heat exchange relationship with the chilled water. The resulting conditioned air is provided to spaces to be cooled.

It is finally to be noted that the water circulating through each fan coil heat exchanger is ultimately pumped back into the chiller 10 by a water pump 14.

The chiller 10 is seen to include a condenser 16 having a fan 18 associated therewith. The heat of condensation of the hot refrigerant vapor refrigerant passing through the condenser 16 is removed by the flow of air produced by the fan 18. This produces high-pressure sub cooled liquid refrigerant at the outlet end of the condenser 16. This high-pressure sub cooled liquid refrigerant flows into an expansion valve 20 and is discharged at a lower pressure. The refrigerant thereafter enters an evaporator 22. The liquid refrigerant in the evaporator will extract heat from water circulating in one or more pipes immersed in the liquid refrigerant within the evaporator. The circulating water in the one or more pipes in the evaporator is the water that has been returned from the distribution points via the pump 14. The resulting chilled water leaves the evaporator 22 and is returned to the distribution points via the pipeline 12. On the other hand, low-pressure refrigerant vapor from the evaporator is directed to the suction inlet of a compressor 24. The compressor 24 compresses the refrigerant vapor that is thereafter discharged to the condenser 16. The compressor 24 preferably includes at least two stages of compression that may be sequentially activated so as to meet the cooling demands placed upon the chiller 10. In this regard, the single compressor 24 of FIG. 1 may for example be a reciprocating compressor having up to six cylinders in which two, four or six pistons could be activated depending on the cooling requirements placed on the system.

Cooling demands on this system are typically based on sensing the temperature of the water leaving the chiller and comparing the same with a set point temperature for the chilled water. For example, if the set point temperature is 7° C. then the chiller controls will define a cooling capacity that will normally achieve a chilled water temperature of 7° C. for the water leaving the chiller. If the leaving water temperature is higher than 7° C., then the chiller controls will add additional cooling capacity by activating additional pistons. If leaving water temperature is lower than 7° C., then the cooling capacity is higher than needed and the chiller controls will reduce cooling capacity by cutting back on the number of activated pistons.

Referring again to the compressor 24, a discharge pressure sensor 26 and a reference temperature sensor 28 are positioned at the outlet of the compressor. A suction pressure sensor 30 is positioned between the outlet of the evaporator 22 and the inlet of the compressor 24. The outputs of the sensors 26, 28, and 30 are connected to a controller 32. As will be explained in detail hereinafter, the controller 32 is operative to control a motor 34 associated with the expansion valve 20 so as to open or close the expansion valve and thereby control the mass flow of refrigerant to the evaporator 22. The control is accomplished in a manner that permits the suction superheat to be minimized at the inlet of the compressor 24 while maintaining an adequate refrigerant vapor status so as to not introduce harmful refrigerant liquid droplets into the compressor.

Figure 2:
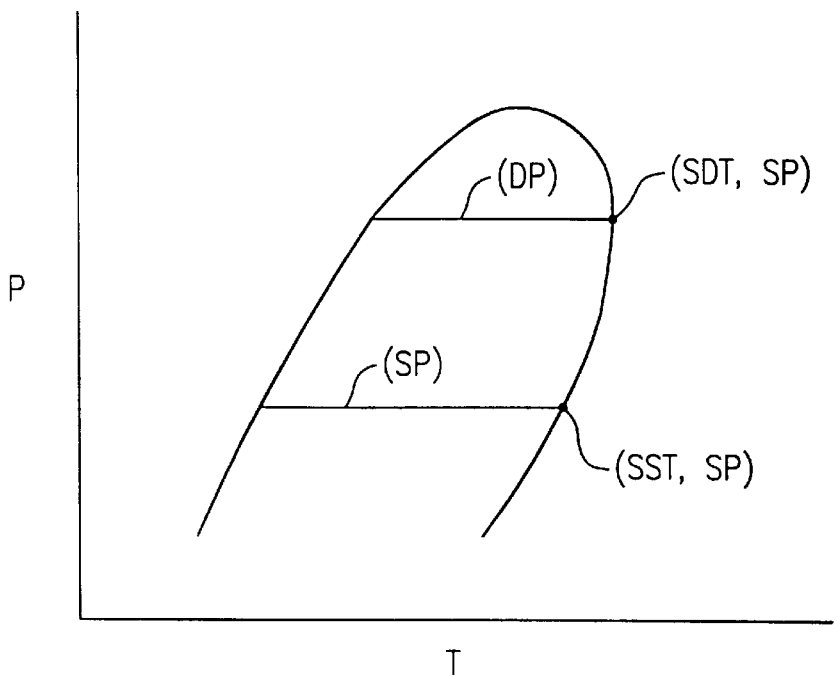
FIG. 2 is a graphical depiction of the compression of refrigerant vapor by the compressor operating at a particular capacity within the chiller system of FIG. 1.

Referring to FIG. 2, a vapor compression curve is illustrated for a particular compressor capacity of the compressor 24. It is to be appreciated that the curve will define a saturated suction temperature, "SST", for a given suction pressure, "SP", sensed by the sensor 30. It is also to be appreciated that the curve will define a saturated discharge temperature, "SDT", for a given discharge pressure, "DP", sensed by the sensor 26.

Figure 3:
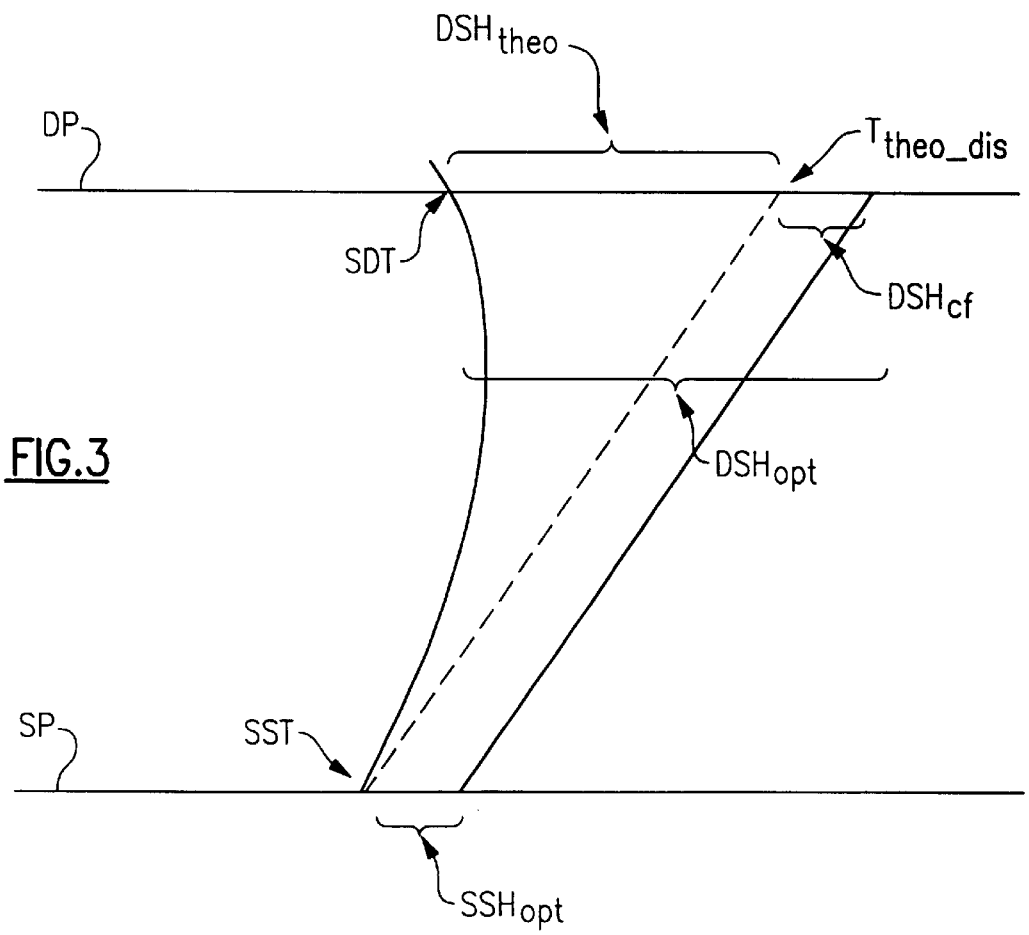
FIG. 3 is an enlargement of a portion of FIG. 2 depicting certain variables having values that are either stipulated or computed by a controller associated with the system of FIG. 1.

Referring now to FIG. 3, an enlargement of a portion of the vapor compression curve of FIG. 2 is further illustrated in conjunction with two sloped lines that define certain variables that are to be computed by the controller 32. In particular, a sloped dashed line $SL_{theo}$ is preferably tangent with the vapor compression curve at a point defined by SST and DP. The dashed line will hence generally represent the slope of the vapor compression curve at this point. This point in FIG. 3 will be hereinafter referred to as zero suction superheat which means that there is zero degrees in temperature of superheat above the saturated suction temperature SST. The sloped line $SL_{theo}$ intersects the discharge pressure line DP at a point defined as $T_{theo\_dis}$ which is defined as the theoretical discharge temperature that would be experienced at the sensor 28 for a zero suction superheat. The difference between the $T_{theo\_dis}$ and the saturated discharge temperature SDT is the theoretical discharge superheat $DSH_{theo}$. As will be explained hereinafter, an optimum discharge superheat $DSH_{opt}$ is preferably computed by adding a discharge superheat correction factor $DSH_{cf}$ to the theoretical discharge superheat $DSH_{theo}$. A sloped line $SL_{opt}$ drawn parallel to the sloped line $SL_{theo}$ intersects the suction pressure line SP so as to define what would be an optimum suction superheat $SSH_{opt}$ corresponding to the computed $DSH_{opt}$.

Figure 4:
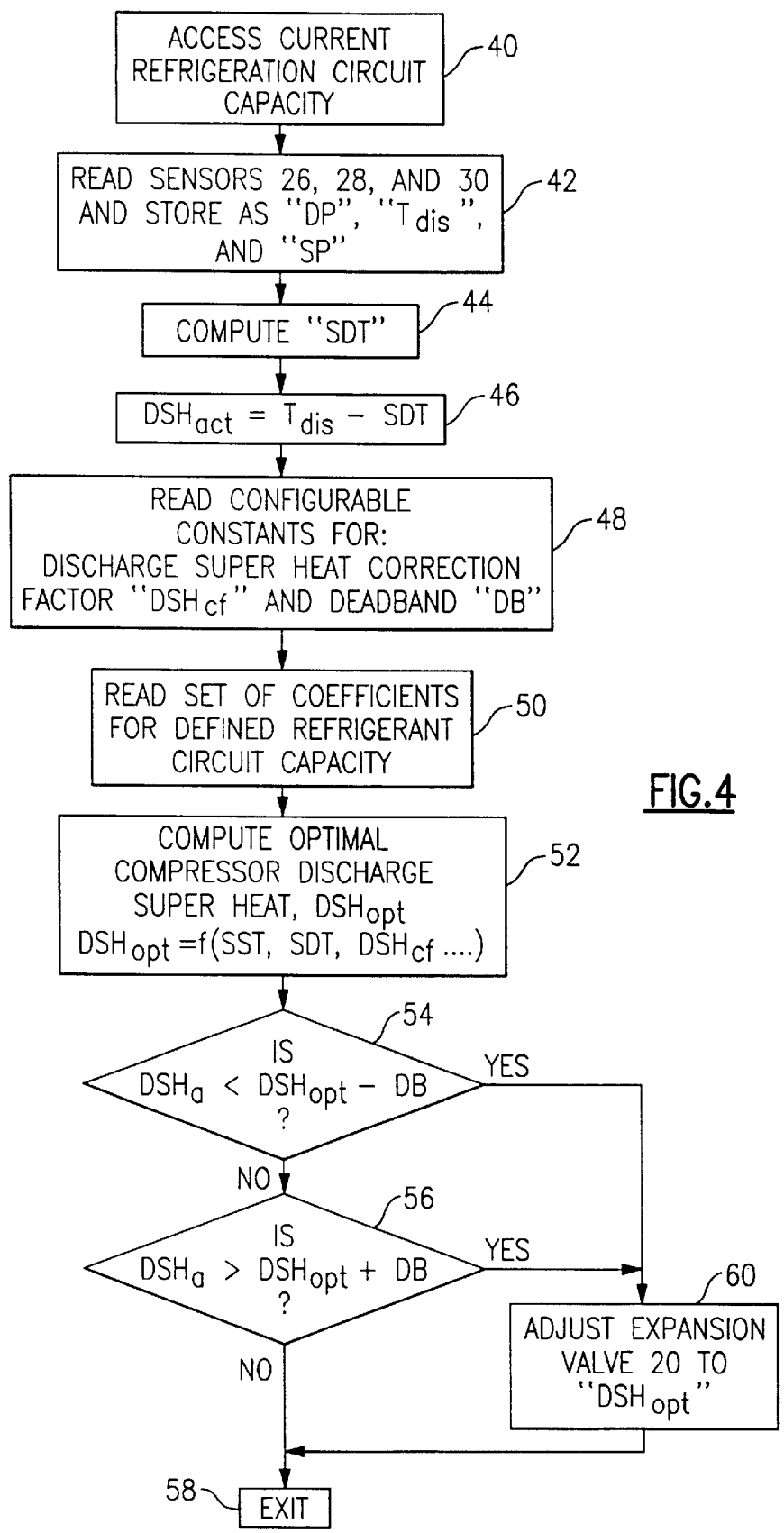
FIG. 4 is a flow chart of a method used by a controller associated with the chiller system of FIG. 1 to control the expansion device within the refrigerant loop of the chiller based on certain of the variables in FIG. 3

Referring now to FIG. 4, a process utilized by a programmable processor within the controller 32 is illustrated. The process begins with a step 40 wherein the programmed processor accesses the currently defined refrigeration circuit capacity. As has been previously discussed, the refrigeration circuit capacity will depend on the cooling demands placed on the system of FIG. 1. The chiller controls will selectively activate the appropriate number of stages of compression to meet these cooling demands. For instance, if the compressor has six cylinders that may be activated in successive pairs, then the number of so activated cylinders will be noted in step 40.

The processor proceeds to a step 42 and either directly reads values or indirectly reads previously stored values of sensed discharge pressure from sensor 28, sensed discharge temperature from sensor 26 and a sensed suction pressure from sensor 30. These read values are stored as "DP", "$T_{dis}$", and "SP" respectively. The processor proceeds in a step 44 to compute or otherwise obtain a value for saturated discharge temperature, "SDT", based upon the value of "DP". As has been noted previously with respect to FIG. 2, a mathematical model of compression can be used to obtain "SDT". The processor next proceeds to a step 46 and computes an actual discharge superheat, "$DSH_{act}$", by subtracting "SDT" from "$T_{dis}$". The processor thereafter proceeds in a step 48 to read certain previously stored configurable constants for discharge superheat correction factor "$DSH_{cf}$" and a permissible discharge superheat deadband "DB".

The processor proceeds in a step 50 to read a set of coefficients for the defined capacity of step 40 that will thereafter be used in a computation carried out in a step 52. It is to be understood that step 50 is preferably implemented by accessing a stored set of coefficients that have been developed from a vapor compression curve such as shown in FIG. 2 for the defined capacity. The processor proceeds to a step 52 and computes an optimal compressor discharge superheat, "$DSH_{opt}$". The algorithm used to compute this optimal compressor discharge superheat may be computed in one or more separate steps. In the preferred embodiment, a theoretical discharge temperature, $T_{theo\_dis,\ is}$ a discharge temperature corresponding to 0° C. suction superheat. It is first calculated based on being a function of suction pressure, "SP", discharge pressure, "DP" and a given value of saturated discharge temperature, "SDT". This may be expressed as follows:

$$T_{theo\_dis} = SDT + A_i + B_i*DP + C_i*SP + D_i*(DP/SP)$$

Suction pressure "SP" and Discharge pressure "DP" are sensed values. Saturated discharge temperature, "SDT", may be either obtained or calculated for a sensed discharge pressure of the compressor operating at a given compressor capacity. $A_i$, is a constant and $B_i$, $C_i$ and $D_i$ are coefficients for a given compressor capacity, indicated by the subscript "i". Values of Ai, $B_i$, $C_i$ and $D_i$ define a linear relationship between $T_{theo\_dis}$ and SP, DP, and SDT. This linear relationship is indicated by the sloped line $SL_{theo}$ in FIG. 3. It is to be appreciated that this linear relationship can be generated using appropriate mathematical modeling principles for vapor compression at a given capacity of compression within a given refrigeration circuit. It is also to be appreciated that values of $A_i$, $B_i$, $C_i$ and $D_i$ can be generated for the three specific compressor capacities for the compressor 24 of FIG. 1. In this case, the programmed processor within the controller will have access to the following sets of coefficients:

Compressor_capacity_1: $A_1$, $B_1$, $C_1$, $D_1$

Compressor_capacity_2: $A_2$, $B_2$, $C_2$, $D_3$

Compressor_capacity_3: $A_3$, $B_3$, $C_3$, $D_3$

It is to be appreciated that the above mathematical algorithm used to compute $T_{theo\_dis}$ can also be based on system variable measurements other than "SP", and "DP". For example, it is possible to build a mathematical algorithm to calculate a theoretical discharge temperature based on measured compressor current, compressor input power or cooling capacity mixed with a measurement of saturated refrigerant temperature measured directly in the condenser and the cooler and can have a different number of constants and coefficients.

Once $T_{theo\_dis}$ is computed, then a theoretical discharge superheat, $DSH_{theo}$, can be computed as follows:

$$DSH_{theo} = T_{theo\_dis} - SDT$$

An optimum discharge superheat DSHopt is preferably calculated by adding the discharge superheat correction factor "$DSH_{cf}$" obtained in step 48 to $DSH_{theo\_as}$ follows:

$$DSH_{opt} = DSH_{theo} + DSPH_{cf}$$

$DSH_{cf}$ is depicted in FIG. 3 as a constant to be added to discharge superheat. This corresponds to a permissible amount of suction superheat SSH defined by the sloped line $SL_{opt}$. In theory the best effectiveness of a system is achieved when suction superheat SSH is equal to 0° C. In reality, operating with a suction superheat SSH of 1 to 3° C. provides additional safety for compressor operation while not significantly impacting system efficiency. The particular value of $DSH_{cf}$ is chosen so as to correspond to an SSH of 1 to 3° C. for a given compressor capacity within the refrigeration circuit.

The processor proceeds to a step 54 a nd inquires as to whether $DSH_{act}$ computed in step 46 is less than $DSH_{opt}$ computed in step 52 minus the permissible discharge superheat deadband "DB". DB is used to prevent instability in the control of the expansion device 20. In this regard, expansion devices have their own "resolution". For example, the valve position of an expansion device may vary 1%. This 1% variation will usually correspond to a 1% variation in the opening of the device. This will in turn result in an increase or decrease of refrigerant flow entering the evaporator which will in turn affect the compressor suction superheat and eventually discharge superheat. It is hence important to define a value of DB that is greater that the corresponding resolution of the valve or opening of the expansion device. For example, if DB is one half degree Centigrade, then the valve position or opening of the expansion device 20 will not change if $DSH_{act}$ is within 0.5° C. of $DSH_{opt}$.

Referring again to step 54, in the event that the answer is no, the processor proceeds to a step 56 and inquires as to whether $DSH_{act}$ is greater than $DSH_{opt}$ plus DB. If the answer is again no, then the processor proceeds to an exit step 58.

Referring again to steps 54 and 56, if the answer is yes to either of these queries, then the processor proceeds to a step 60 and adjusts the position of the expansion valve 20 through appropriate signals to the motor 34 so as to satisfy $DSH_{opt}$. The processor thereafter proceeds to exit step 58.

It is to be appreciated that the processor will repeatedly implement steps 40 though 60 in a timely manner so as to maintain control of the motor 34 associated with the expansion valve 20. The amount of time between successive implementations will depend on the particular motor and associated expansion valve as well as the refrigerant loop in which the expansion valve operates.

Figure 5:
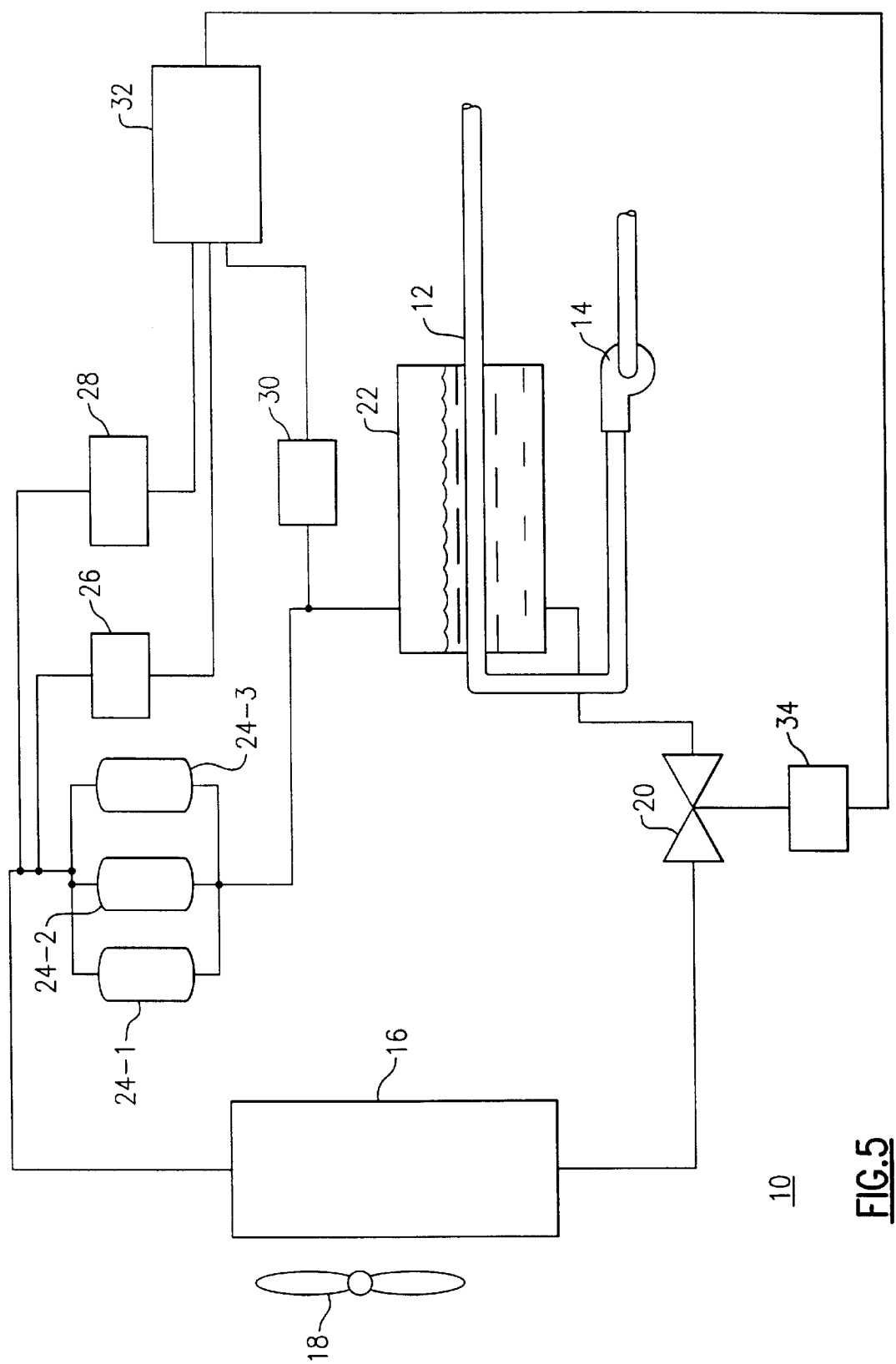
FIG. 5 is a schematic view of an alternative chiller system having parallel compressors.

Referring now to FIG. 5, wherein the single compressor configuration of the chiller system in FIG. 1 has been replaced with three compressors 24-1, 24-2, and 24-3 operating in parallel. It is to be appreciated that controls for the chiller will add or subtract cooling capacity by adding or subtracting one or more of the compressors operating in parallel. If each compressor is identical then each compressor that is added or subtracted will produce the same discharge temperature and each will have the same compression process model such as shown in FIG. 2. On the other hand, if the compressors are different (different compressor effectiveness) then each compressor discharge temperature may be different and it may be necessary to calculate or obtain discharge temperature corresponding to each different compressor based on specific models for each compressor. It is to be noted that the pressure sensor 26 and the temperature sensor 28 are each located in a common discharge manifold for the compressors 24-1, 24-2, and 24-3. It is also to be noted that the pressure sensor 30 is located in a common input manifold to the identical compressors 24-1, 24-2, and 24-3.

Figure 6:
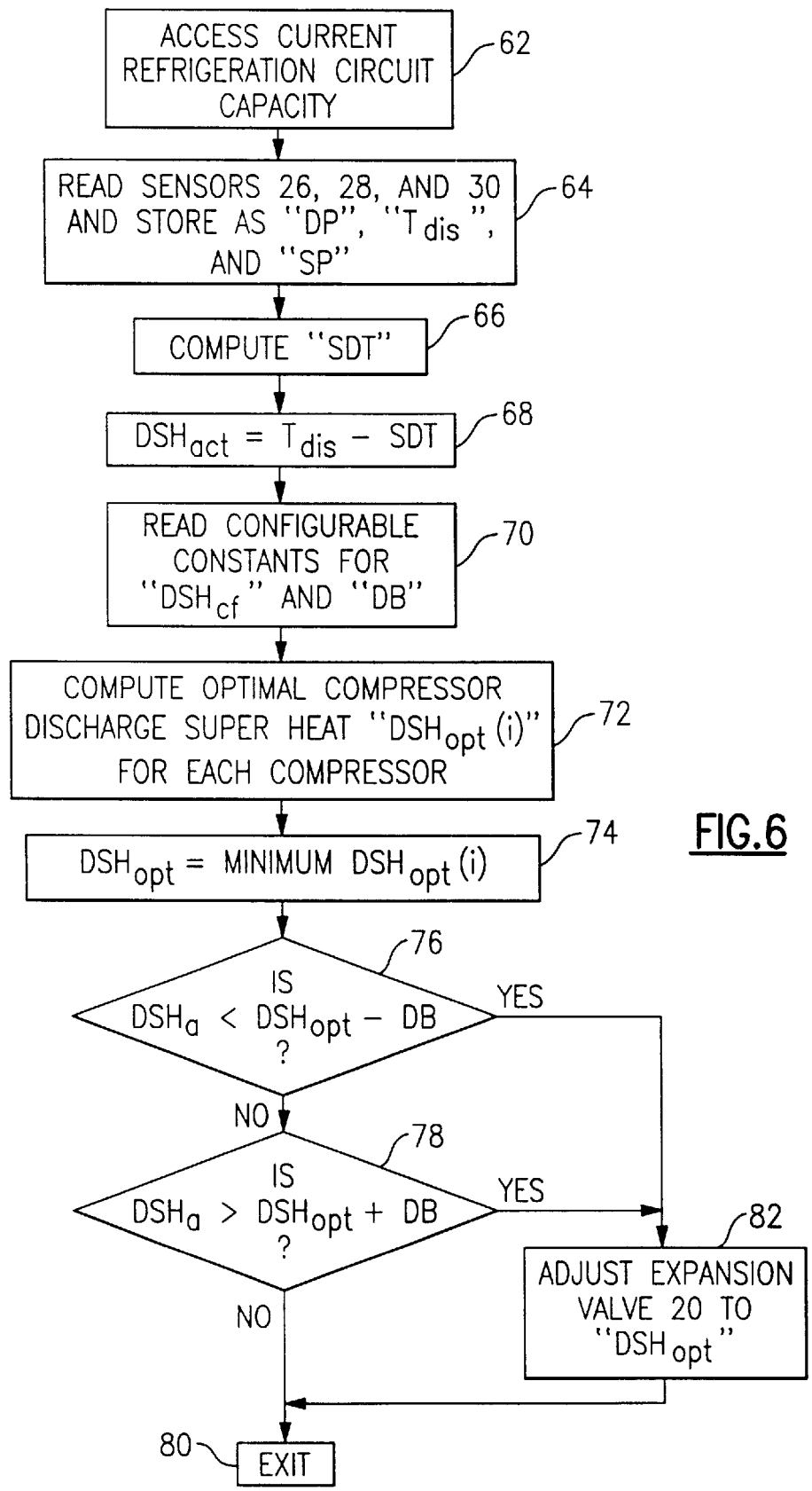
FIG. 6 is a flow chart of a method used by a controller associated with the chiller system of FIG. 5 to control the expansion device within the refrigerant loop of the chiller.

Referring now to FIG. 6, a process utilized by a programmable processor within the controller 32 is illustrated for the chiller configuration of FIG. 4. It is to be noted that most of the steps in FIG. 5 are the same as those in the process of FIG. 3. In this regard, current refrigerant capacity is read in a step 62. Since the compressor configuration of FIG. 4 is three parallel compressors, the processor will note how many of these compressors have been activated. The sensors 26, 28, and 30 for the system of FIG. 4 are read in step 64 before computing a saturated discharge temperature "SDT" in step 66 based upon the value of DP read from the pressure sensor 26. In this regard, the saturated discharge temperature is preferably based on the compression process model for the number of activated compressors indicated by the refrigeration circuit capacity noted in step 62.

Referring now to step 68, the processor calculates an actual discharge superheat, $DSH_{act}$ based on the read discharge temperature from sensor 26 and "SDT" as computed in step 66. The processor now proceeds in a step 70 and reads the configurable constants $DSH_{cf}$ and DB. The processor proceeds in step 72 to compute an optimal compressor discharge superheat "$DSH_{opt}(i)$" for each activated compressor. This is preferably accomplished by first computing a theoretical discharge temperature for each compressor as follows:

$$T_{theo\_dis}(i) = SDT + A_i + B_i * DP + C_i * SP + D_i * (DP/SP)$$

Suction pressure (SP) and Discharge pressure (DP) are sensed values. Saturated discharge temperature (SDT) is either obtained or calculated for the sensed discharge pressure in step 66. $A_i$ is a constant and $B_i$, $C_i$ and $D_i$ are coefficients corresponding to the specific compression capacity of the given compressor. Values for $A_i$, $B_i$, $C_i$ and $D_i$ will have been previously derived and stored for use in the computation. If the three compressors each have their own particular capacities, then the programmed processor within the controller will have access to the following sets of coefficients:

Compressor_24-1: $A_1$, $B_1$, $C_1$, $D_1$
Compressor_24-2: $A_2$, $B_2$, $C_2$, $D_3$
Compressor_24-3: $A_3$, $B_3$, $C_3$, $D_3$ It is to be appreciated that if each of the compressors are the same, then the programmed processor will only need to perform one computation of $\text{Ttheo}\_{dis}$ since the values of $A_i$, $B_i$, $C_i$ and $D_i$ will be the same.

Once $T_{theo\_dis}(i)$ is computed for each active compressor, then a theoretical discharge superheat, $DSH_{theo}(i)$ for each active compressor can also be computed as follows:

$$DSH_{theo}(i) = T_{theo\_di}(i) - SDT$$

An optimum discharge superheat for each compressor is next preferably calculated by adding the discharge superheat correction factor "$DSH_{cf}$" obtained in step 70 to $DSH_{theo}(i)$ for each compressor as follows $$DSH_{opt}(i) = DSH_{theo}(i) + DSPHcf$$

The processor proceeds in a step 72 to select the minimum $DSH_{opt}(i)$ computed in step 72 and sets the same equal to $DSH_{opt}$. The processor now proceeds to step 76 and inquires as to whether $DSH_{act}$ computed in step 68 is less than $DSH_{opt}$ computed in step 74 minus the permissible discharge superheat deadband "DB". In the event that the answer is no, the processor proceeds to a step 78 and inquires as to whether $DSH_{act}$ is greater than $DSH_{opt}$ plus DB. If the answer is again no, then the processor proceeds to an exit step 80.

Referring again to steps 76 and 78, if the answer is yes to either of these queries, then the processor proceeds to a step 82 and adjusts the position of the expansion valve 20 through appropriate signals to the motor 34 so as to satisfy $DSH_{opt}$. The processor thereafter proceeds to exit step 80.

It is to be appreciated that the processor will repeatedly implement steps 62 though 82 in a timely manner so as to maintain control of the motor 34 associated with the expansion valve 20. The amount of time between successive implementations will depend on the particular motor and associated expansion valve as well as the refrigerant loop in which the expansion valve operates.

It is to be appreciated that a preferred embodiment of the invention has been disclosed. Alterations or modifications may occur to one of ordinary skill in the art. For instance, the chiller systems of FIG. 1 or 5 could be replaced with almost any type of air conditioning or refrigeration system employing an electronically controlled expansion device to be controlled using the processes of FIG. 4 or the process of FIG. 6. Furthermore, the processes of FIG. 4 or 6 could be modified so as to automatically repeat after a predefined time through an appropriate delay being implemented instead of the exit step.

It will be appreciated by those skilled in the art that further changes could be made to the above-described invention without departing from the scope of the invention. Accordingly, the foregoing description is by way of example only and the invention is to be limited only by the following claims and equivalents thereto.

What is claimed is:

1. A process for controlling an expansion device within a refrigerant loop of a cooling system, said process comprising the steps of:

sensing temperature and pressure at the outlet of at least one compressor within the refrigerant loop;

obtaining a saturated discharge temperature based upon the sensed pressure at the outlet of the at least one compressor;

computing a discharge superheat at the outlet of the at least one compressor using the saturated discharge temperature; and controlling the expansion device within the refrigerant loop in response to the computed discharge superheat, wherein said step of computing a discharge superheat includes the step of generating a mathematical algorithm for computing the discharge superheat that is based upon the capacity of the at least one compressor within the refrigerant loop.

2. The process of claim 1 wherein said step of computing a discharge superheat includes tho steps of:

sensing the pressure between the evaporator and the inlet of the at least one compressor; and computing a theoretical discharge temperature corresponding to a zero degree suction superheat as a function of the sensed pressure at the outlet of the at least one compressor and the sensed pressure between the evaporator and the inlet of the at least one compressor.

3. The process of claim 2 wherein said step of computing a theoretical discharge temperature includes using at least one constant applied to the sensed pressure at the outlet of the at least one compressor or the sensed pressure between the evaporator and the inlet of the at least one compressor wherein the constant is selected based upon the capacity of the at least one compressor within the refrigerant loop.

4. The process of claim 2 wherein said step of computing a discharge superheat includes the steps of:

computing a theoretical discharge superheat based upon the computed theoretical discharge temperature corresponding to zero degree suction heat; and adding a discharge superheat correction factor to the computed discharge superheat.

5. The process of claim 2 wherein the refrigerant loop contains a plurality of compressors each of which may be activated in response to the cooling demand placed upon the cooling system and wherein said step of computing a discharge superheat using the saturated discharge temperature comprises the step of:

generating a mathematical algorithm for computing the discharge superheat that is based upon the number of active compressors within the refrigerant loop.

6. The process of claim 2 wherein the refrigerant loop contains a plurality of compressors each of which may be activated in response to the cooling demand placed upon the cooling system and wherein said step of sensing temperature and pressure of the outlet of the at least one compressor includes the step of sensing temperature and pressure at a common manifold outlet of the compressors and wherein said step of computing a discharge superheat includes the steps of:

sensing pressure between an evaporator and a common manifold inlet of the compressors; and computing at least one theoretical discharge temperature corresponding to a zero degree suction superheat as a function of the sensed pressure at the common manifold outlet of the compressors and the sensed pressure at the common manifold inlet of the compressors.

7. The process of claim 6 wherein said step of computing at least one theoretical discharge temperature includes using at least one constant applied to the discharge pressure or the suction pressure wherein the constant is selected based upon the number of activated compressors within the refrigerant loop.

8. The process of claim 6 wherein said step of computing a discharge superheat includes the steps of:
computing a theoretical discharge superheat based upon the computed theoretical discharge temperature corresponding to zero degree suction heat; and
adding a discharge superheat correction factor to the computed discharge superheat.

9. The process of claim 1 wherein said of controlling the expansion device in response to the computed discharge superheat includes the steps of:
determining an actual discharge superheat;
determining whether the actual discharge superheat is within a range of predetermined values; and
changing the refrigerant flow rate through the expansion device when the actual discharge superheat is outside of the range of predetermined values.

10. The process of claim 9 defining the predetermined values by using at least one predetermined variance with respect to the computed discharge superheat.

11. The process of claim 1 wherein said step of obtaining a saturated discharge temperature comprises the step of:
obtaining a saturated discharge temperature for a particular capacity of the at least one compressor.

12. The process of claim 1 further comprising the step of:
noting the current capacity for the at least one compressor within the refrigerant loop; and
using the noted capacity to determine one or more values used in said step computing the discharge superheat.

13. A system for controlling an expansion device within a refrigerant loop of a cooling system, said system comprising:
a sensor for sensing temperature at the outlet of at least one compressor within the refrigerant loop;
a sensor for sensing pressure at the outlet of the at least one compressor within the refrigerant loop; and
a processor operative to obtain a saturated discharge temperature based upon the sensed pressure at the outlet of the at least one compressor, said processor being operative to commute a discharge superheat using the saturated discharge temperature, said processor being furthermore operative to control the expansion device within the refrigerant loop in response to the computed discharge superheat,
wherein said processor is furthermore operative to generate a mathematical algorithm when computing the discharge superheat, the algorithm being based upon the current capacity of the at least compressor within the refrigerant loop.

14. The system of claim 13 furthermore comprising:
a sensor for sensing pressure between the outlet of the evaporator and the inlet of the at least one compressor in the refrigerant loop; and
wherein said processor is operative when computing a discharge superheat to compute a theoretical discharge temperature corresponding to a zero degree suction superheat as a function of the sensed pressure at the outlet of the at least one compressor and the sensed pressure between the evaporator and the inlet of the at least one compressor.

15. The system of claim 14 wherein said processor uses when computing a theoretical discharge temperature at least one constant applied to the sensed pressure at the outlet of the at least one compressor or the sensed pressure between the evaporator and the inlet of the at least one compressor wherein the constant is selected based upon the current capacity of the at least one compressor within the refrigerant loop.

16. The system of claim 14 wherein said processor is operative when computing a discharge superheat to compute a theoretical discharge superheat based upon the computed theoretical discharge temperature corresponding to zero degree suction heat; and to add a discharge superheat correction factor to the computed discharge superheat.

17. The system of claim 13 wherein the refrigerant loop contains a plurality of compressors each of which may be activated in response to the cooling demand placed upon the cooling system and wherein said processor is operative when computing a discharge superheat to generate a mathematical algorithm for computing the discharge superheat that is based upon the number of active compressors within the refrigerant loop.

18. The system of claim 13 wherein the refrigerant loop contains a plurality of compressors each of which may be activated in response to the cooling demand placed upon the cooling system and wherein said processor is operative when sensing temperature and pressure at the outlet of the at least one compressor to sense temperature and pressure at a common manifold outlet of the compressors and wherein said processor is furthermore operative when computing a discharge superheat to compute a theoretical discharge temperature correspond to a zero degree suction superheat as a function of the sensed pressure at the common manifold outlet of the compressors.

19. The system of claim 18 wherein said processor is operative when computing a theoretical discharge temperature to use at least one constant applied to the discharge pressure wherein the constant is selected based upon the number of activated compressors within the refrigerant loop.

20. The system of claim 18 wherein said processor is operative when computing a discharge superheat to compute a theoretical discharge superheat based upon the computed theoretical discharge temperature corresponding to zero degree suction heat and wherein said processor is furthermore operative to add discharge superheat correction factor to the computed discharge superheat.

21. The system of claim 13 wherein said processor is furthermore operative to compute an actual discharge superheat and determine whether the actual discharge superheat is within a range of predetermined values when controlling the expansion device and to change the refrigerant flow rate through the expansion device when the actual discharge superheat is outside of the range of predetermined values.

22. The system of claim 21 wherein said processor is furthermore operative to define the predetermined values by using at least one predetermined variance with respect to a computed discharge superheat.

23. The system of claim 13 wherein said processor is operative to obtain a saturated discharge temperature for a particular capacity when obtaining a saturated discharge temperature.

24. The system of claim 13 wherein said processor is furthermore operative to note the current capacity for the at least one compressor within the refrigerant loop and to thereafter use the noted current capacity to determine one or more values used in computing the discharge superheat.

* * * * *